United States Patent Office 2,842,287
Patented July 8, 1958

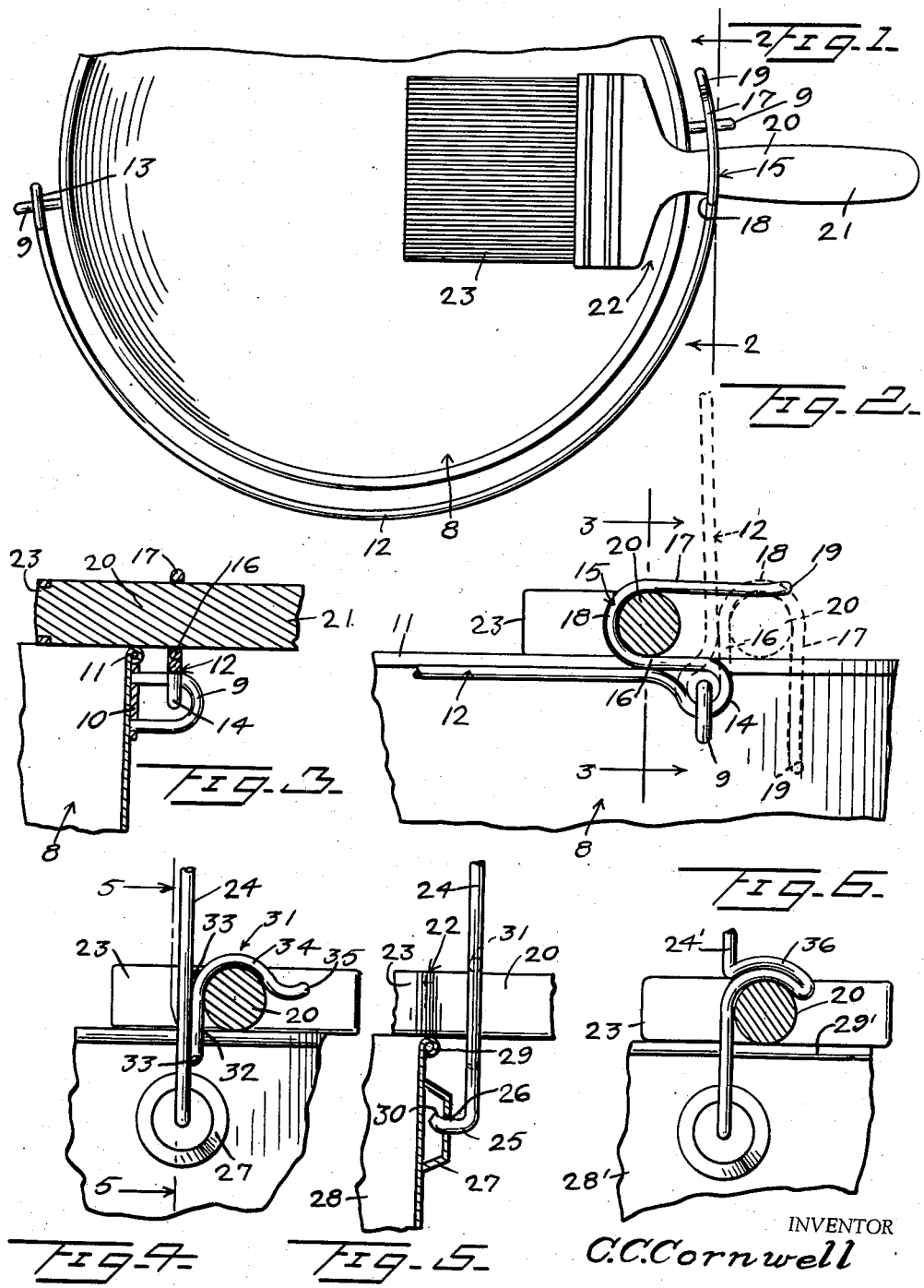

2,842,287

CONTAINER BAIL WITH BRUSH HOLDER

Claude C. Cornwell, Toledo, Ohio

Application July 5, 1956, Serial No. 595,902

6 Claims. (Cl. 220—95)

This invention relates to a novel construction of container bail including means for supporting a paintbrush, and is primarily adapted for use in connection with the bail of a paint container such as a bucket or pail.

More particularly, it is an aim of the present invention to provide a brush holder forming a part of a container bail which is capable of functioning for supporting a paintbrush with the longitudinal axis of the paintbrush disposed substantially horizontal and when the bail is either in a raised carrying position relative to its container or in a lowered inoperative position, so that the head of the brush will be supported over the open top of the container to which the bail is pivotally attached.

Various other objects and advantages of the invention will hereinafter become more fully apparent from the following description of the drawing, illustrating presently preferred embodiments thereof, and wherein:

Figure 1 is a fragmentary top plan view of a paint container and showing the preferred form of the bail swingably attached thereto and supporting a paintbrush, with the bail in a lowered position;

Figure 2 is an enlarged fragmentary vertical sectional view, primarily in elevation, taken substantially along a plane as indicated by the line 2—2 of Figure 1;

Figure 3 is a fragmentary vertical sectional view taken substantially along a plane as indicated by the line 3—3 of Figure 2;

Figure 4 is a view partly in elevation and partly in section, taken substantially along a plane corresponding to the plane of Figure 2 and illustrating a modified form of the invention;

Figure 5 is a vertical sectional view, taken substantially along a plane as indicated by the line 5—5 of Figure 4, and Figure 6 is a view corresponding to Figure 4 and illustrating another modified form of the invention.

Referring more specifically to the drawing and first with reference to Figures 1, 2 and 3, a portion of a container of the type adapted for use in holding paint, such as a pail or bucket, is shown in these views and is designated generally 8. A pair of staple-like fastenings 9 is secured by suitable fastening means 10 to the exterior of the wall of the container 8 beneath and adjacent the open top or rim 11 thereof, so that the staples or loops 9 extend outwardly from substantially diametrically opposite portions of the container. The container 8 is provided with a bail 12 formed of a strand of heavy gauge wire or the like, one end of which is bent to provide an eye 13 which is loosely connected to one of the loops or staples 9. The strand forming the bail 12, near to but spaced from its opposite end, is provided with a second eye 14, as best seen in Figure 2, which loosely engages the other staple or loop 9. The parts 8 through 14 are of conventional construction except that the eye 14 does not have a part constituting a terminal of the strand forming the bail 12.

The brush holder, designated generally 15 and constituting the invention, in the embodiment thereof as illustrated in Figures 1 to 3, is formed by the end portion of the strand which forms the bail 12 and which is disposed beyond the part of said strand forming the eye 14. Said brush holder is in the form of a hook and includes an inner leg 16, an outer leg 17 and a bight portion 18. The inner leg 16 is substantially straight and is disposed substantially parallel to the plane of the bail 12 and forms a straight extension of a part of the eye 14 and preferably has a part thereof bearing against a part of the bail 12 for closing the eye 14. Thus, a part of the inner leg 16 also forms a part of the eye 14. The bight portion 18 is substantially semicircular and extends between complementary ends of the legs 16 and 17. The outer leg 17 is disposed substantially parallel to the inner leg 16 and is longer than said inner leg so that the terminal 19 of the outer leg, which is preferably flared outwardly as seen in Figure 2, is disposed beyond the outer end of the inner leg 16 and beyond the eye 14.

The legs 16 and 17 of the brush holder 15 are spaced apart a distance to snugly accommodate therebetween a restricted inner part or neck portion 20 of the handle 21 of a conventional paintbrush 22. With the bail 12 lowered to or beyond its position of Figure 2 so that the brush holder 15 opens horizontally or upwardly, the neck portion 20 is inserted from right to left of Figure 2 into the brush holder 15 until said neck portion 20 bears against the bight portion 18 of the holder. The brush 22 is positioned so that the handle 21 extends outwardly from the holder 15 and the brush head 23 extends inwardly therefrom so as to be disposed over the open top of the container 8. The brush holder 15 is sufficiently resilient so that the outer leg 17 thereof can yield outwardly for spreading the brush holder to accommodate the neck 20, if said neck should be slightly larger in diameter than the spacing between the legs 16 and 17. As seen in Figure 1, the bail eyes 13 and 14 are spaced apart a distance greater than the exterior diameter of the rim 11 and said bail eyes engage the loops or staples 9 near to the outer ends thereof and are in engagement with the upper legs of said staples 9. If the bail 12 is inclined downwardly as the brush 22 is applied thereto, said bail will be lifted to substantially a horizontal position as the neck 20 moves inwardly of the holder 15 over the eye 14 by engagement of an inner portion of the neck 20 with a part of the rim 11 which is located adjacent the holder 15, so that said rim portion will cooperate with the holder for positioning the brush 22 in substantially a horizontal plane. Additionally, the brush and holder will thus cooperate with the rim 11 for maintaining the bail 12 in substantially a horizontal position. However, the bail 12 can be lifted slightly from its position of Figures 1 to 3 and will still support the paintbrush with the longitudinal axis thereof substantially horizontal and out of contact with the rim 11, so that said rim is not essential to the support of the paintbrush 22 by the brush holder 15.

It will thus be seen that the brush holder 15 will effectively function to support the paintbrush 22 when not in use and with the brush head 23 located over the container 8 so that paint draining therefrom will drain into the container 8. The holder 15 will also function to support the paintbrush 22 while the bail 12 is raised for carrying the container 8, as illustrated in dotted lines in Figure 2. Thus, if it is desired to pick up the container 8 while the brush 22 is supported by the holder 15, it is merely necessary to lift the bail to substantially an upright position in a conventional manner. This will cause the holder 15 to swing clockwise as seen in Figure 2 from its full line to its dotted line position and the neck 20 of the brush to swing in an arc with said holder clockwise to its dotted line position of Figure 2 and wherein the bight portion 18 will engage over a part of the neck 20 and another part thereof will rest on a part of the rim 11, and said neck will be embraced between portions of the legs 16 and 17. The bail 12 may also be returned from its operative, dotted line position of Figure 2 to its inoperative full line position with the brush neck 20 engaged by the holder 15 and when so moved in a counterclockwise direction the outer leg 17 of the holder will cause the paintbrush to be displaced from right to left from its dotted line back to its full line position of Figure 2.

Figures 4 and 5 illustrates a slightly modified form of the brush holder in conjunction with an end portion 24 of a container bail and which has an inturned part 25 which extends through an opening 26 of a hollow projection or boss 27 which is secured to the outer side of and projects from a part of the wall of a paint container 28, and which is disposed below and adjacent a portion of the container rim 29. The inturned bail portion 25 has an angularly bent terminal portion 30 which is disposed within the hollow boss and which prevents the bail portion 25 from being disengaged from the boss 27. The parts 24 through 30 are conventional.

The brush holding attachment, designated generally 31, is formed from a separate strand of wire having substantially the shape of a hook including a straight shank end portion 32 which is secured to the bail portion 24 near to but spaced from the inturned part 25, in any suitable manner as by welding, as seen at 33. The brush holder 31 includes an arcuate portion 34 which curves away from the bail portion 24 and which forms an extension of the end of the shank 32 which is disposed remote from the bail part 25. Said portion 34 is substantially semicircular in shape and terminates at its outer end in a reversely curved bill portion 35. The brush holder 31, like the brush holder 15, is disposed in a plane normal to the plane of the bail with which it is associated.

When the bail is disposed in an upright carrying position as seen in Figure 4, the brush holder 31 will be disposed to open downwardly and engage over the neck 20 of the paintbrush 22 and another part of the neck 20 will rest upon the portion of the rim 29 which is disposed inwardly with respect to the brush holder 31, as seen in Figures 4 and 5, for supporting the brush 22 in substantially a horizontal position, while the bail is in an upright position, and with the brush head 23 positioned over the open top of the container 28. It will also be obvious that the brush holder terminal 25 could be elongated and shaped to correspond with the outer leg 17 of the brush holder 15.

Figure 6 illustrates another modification of the invention and which is similar to the modification of Figures 4 and 5 but differs therefrom in that the bail portion 24' is provided with an integral lapped portion 36 which extends laterally from the plane of the bail and which is longitudinally bowed so that the underside thereof is concave when the bail portion 24' is in an upright position as seen in Figure 6. The lapped portion 36, forming the brush holder, is disposed sufficiently above the level of the lower end of the bail portion 24' so as to be disposed above the level of the receptacle rim 29' when said bail portion 24' is in an upright position. The brush holder 36 is adapted to engage over a portion of the handle neck 20 and another portion of the handle neck rests upon the rim 29' in the same manner as previously described with reference to the brush holder 31, for supporting the paintbrush substantially horizontal and with the brush head 23 located over the open top of the container 28' when the bail is in an upright carrying position. The lapped portion 36 could obviously be elongated and shaped to conform to the portions 17 and 18 of the brush holder 15.

Various other modifications and changes are contemplated and may be resorted to, without departing from the function or scope of the invention as hereinafter defined by the appended claims.

I claim as my invention:

1. In combination with an end portion of a container bail, a portion of a container to which said end portion of the bail is pivotally connected, and a rim portion of the container disposed above the level of said bail pivot; a brush holder carried by said bail portion including spaced substantially parallel inner and outer legs between which a portion of the handle of a brush is adapted to engage when another portion of the brush handle is resting upon said rim portion for supporting the brush with the head thereof extending inwardly over the open top of the container, said brush holder including an inner end portion extending between complementary ends of said legs and against which a portion of the handle is adapted to bear and which is disposed remote from the terminal of said bail end, and said brush holder having an opposite open end through which the brush handle is slidably movable into and out of engagement with the brush holder, said brush holder being disposed in a plane normal to the plane of said bail portion and crosswise of the pivotal axis thereof, the terminal of said bail end constituting an eye adapted to engage a fastening which extends outwardly from the upper portion of the container and which eye is adapted to be spaced outwardly from said part of the container rim, said inner leg constituting an integral extension of a part of said eye, said legs being disposed in planes substantially parallel to the plane of said bail portion for supporting the brush with a part thereof in engagement with the container rim when said legs are disposed substantially parallel to the container rim.

2. In a brush holder as in claim 1, said outer leg being substantially longer than the inner leg and having a distal end disposed beyond said bail eye.

3. In combination with an end portion of a container bail, a portion of a container to which said end portion fo the bail is pivotally connected, and a rim portion of the container disposed above the level of said bail pivot; a brush holder carried by said bail portion and disposed in a plane normal to the plane of the bail portion and crosswise of the pivotal axis thereof, said brush holder including a part adapted to overlie and bear on a portion of a paintbrush handle when said bail portion is in substantially an upright position, and said brush holder part being disposed at a level above the level of said rim portion whereby another portion of the brush handle will rest upon said rim portion for supporting the brush in substantially a horizontal plane and with the brush head extending inwardly and disposed over the open top of the container, said brush holder comprising an integral extension of the terminal part of said bail portion and comprising substantially parallel inner and outer legs and an intermediate portion extending between and connecting complementary ends of said legs, said intermediate portion constituting said aforementioned handle engaging part, said inner leg forming a turned back extension of the terminal of said bail portion.

4. In combination with an end portion of a container bail, a portion of a container to which said end portion of the bail is pivotally connected, and a rim portion of the container disposed above the level of said bail pivot; a brush holder carried by said bail portion and disposed in a plane normal to the plane of the bail portion and crosswise of the pivotal axis thereof, said brush holder including a part adapted to overlie and bear on a portion of a paintbrush handle when said bail portion is in substantially an upright position, and said brush holder part being disposed at a level above the level of said rim portion whereby another portion of the brush handle will rest upon said rim portion for supporting the brush in substantially a horizontal plane and with the brush head extending inwardly and disposed over the open top of the container, said brush holder comprising a separate strand of wire having a substantially straight end portion disposed longitudinally of and secured to a part of said bail portion.

5. In combination with an end portion of a container bail, a portion of a container to which said end portion of the bail is pivotally connected, and a rim portion of the container disposed above the level of said bail pivot; a brush holder carried by said bail portion and disposed in a plane normal to the plane of the bail portion and crosswise of the pivotal axis thereof, said brush holder including a part adapted to overlie and bear on a portion of a paintbrush handle when said bail portion is in substantially an upright position, and said brush holder part being disposed at a level above the level of said rim portion whereby another portion of the brush handle will rest upon said rim portion for supporting the brush in substantially a horizontal plane and with the brush head extending inwardly and disposed over the open top of the container, said brush holder comprising a longitudinally curved lapped part of said bail portion, said lapped part extending laterally from the bail portion and having a concave inner side facing toward the distal end of said bail portion.

6. In combination with an end portion of a container bail, a portion of a container to which said end portion of the bail is pivotally connected, and a rim portion of the container disposed above the level of said bail pivot; a brush holder carried by said bail portion including a substantially rigid part extending laterally from said bail portion and spaced from said bail pivot a distance greater than the spacing between said bail pivot and said rim portion, said brush holder part being adapted to overlie and bear on a part of a brush handle when said bail portion is in a substantially upright position to retain the brush handle in substantially a horizontal position with another part thereof resting on said rim portion and with the brush head disposed inwardly of said rim portion and bail portion, said brush holder including a second part extending from said first mentioned part in a direction toward said bail pivot, said second part being spaced from and disposed substantially parallel to said bail portion and being adapted to overlie and bear on said first mentioned part of the brush handle, when the bail portion is swung from a vertical position to substantially a horizontal position in a direction to cause said second part of the brush holder to assume a position above said bail portion, for cooperation of said second part of the brush holder with said rim portion to support the brush handle in the horizontal position thereof, said second part of the brush holder functioning in cooperation with said rim portion and the brush handle to support said bail portion in substantially a horizontal position, and said brush holder parts cooperating with said rim portion and the brush handle to support said bail portion in substantially an upright position.

References Cited in the file of this patent

UNITED STATES PATENTS

| | | |
|---|---|---|
| 537,546 | Nellis | Apr. 16, 1895 |
| 606,276 | Cogley | June 28, 1898 |
| 770,208 | Williams | Sept. 13, 1904 |
| 1,100,464 | Yates et al. | June 16, 1914 |
| 1,148,399 | Perry | July 27, 1915 |
| 1,865,283 | Sohnle | June 28, 1932 |
| 2,567,788 | Salmon | Sept. 11, 1951 |